United States Patent [19]
McWilliams

[11] Patent Number: 6,044,226
[45] Date of Patent: Mar. 28, 2000

[54] ATTENTION FOCUSING DEVICE AND METHOD FOR PHOTOGRAPHY SUBJECT

[76] Inventor: Steven M. McWilliams, 3636 Purdue, Dallas, Tex. 75225

[21] Appl. No.: 08/870,767

[22] Filed: May 16, 1997

[51] Int. Cl.[7] .................................................. G03B 15/00

[52] U.S. Cl. .............................................. 396/1; 348/722

[58] Field of Search ................... 396/1, 2, 3, 4, 396/376; 348/722; 359/633, 839, 850, 856, 857

[56] References Cited

U.S. PATENT DOCUMENTS 2,711,667   6/1955   Simjian ............................... 348/722 X

*Primary Examiner*—Howard B. Blankenship
*Attorney, Agent, or Firm*—Fulbright & Jaworski L.L.P.

[57] ABSTRACT

A device and method for focusing the attention of subjects of photography is disclosed. A point of interest is reflected by a reflective pane which in turn is reflected by a beam splitter, toward the subject of the photography, into an image area. Photography equipment is placed behind the beam splitter and image area. Reflection of the image at the point of interest into the image area results in focusing the attention of the photography subject to the location desired.

11 Claims, 3 Drawing Sheets

ATTENTION FOCUSING DEVICE AND METHOD FOR PHOTOGRAPHY SUBJECT

TECHNICAL FIELD OF THE INVENTION

In photography, the eye movement of a subject is critical. For example, the fact that the eye of a subject is not focused in the camera lens, but rather focused to the side of a camera lens, is immediately discernable. This invention addresses the need to have subjects of photography look directly to a specific location, for example into a camera lens.

BACKGROUND OF THE INVENTION

Currently in the motion picture and television production industries there is no reliable means for consistently coaxing subjects of photography to look directly into the camera lens. In the current state of the art, when the subject of photography is an animal, a trainer will attempt to focus the animal's eyes on food strategically located near the camera lens. Or, a photographer may attempt to focus a small child's eyes upon a toy located near the camera lens.

However, these techniques for focusing a photography subject's attention into the lens are not effective. When food is used to focus the attention of an animal, the animal's gaze will focus upon the food in the trainer's hand, not the lens. Meanwhile, when toys are used as a focal point for small children, the children will gaze intently upon the toys. Rather than focusing the eyes of the photography subjects into the camera lens, these techniques result in focusing the subject's eyes to either side of, above, or below the camera lens. Furthermore, because these techniques do not focus the eyes of the subject directly into the camera lens as desired, the animal trainer or photographer is often required to continue coaxing the subject in the hopes of focusing the subject's attention in the appropriate location. The continued coaxing requires time and is unnecessarily stressful for the photography subject, the handler, parent, and photographer.

Another prior art technique for focusing the eye of a photography subject directly into the lens of a camera is a teleprompter. Teleprompters are primarily used by adults who must read scripts while appearing to focus directly into the camera lens. Teleprompter technology utilizes a video screen facing a one way mirror placed in front of a camera lens. The image reflected by a one way mirror usually has left and right transposed. Thus, text must be flipped electronically to be read in a reflection. A mirror image of the video screen display is then displayed directly in front of the camera lens to the photography subject thereby focusing the subject's attention directly into the camera lens.

Teleprompter technology is particularly ineffective with animals and small children. The video screen displays used with teleprompters have no apparent depth. Thus, teleprompters produce processed images which do not appear real, and animals and small children will often ignore images produced in this manner.

Furthermore, prior art teleprompters require removing the individual soliciting the response from the proximity of the photography subject. In one embodiment, state of the art teleprompters use previously recorded video or previously prepared text which is then displayed on the teleprompter mirror. In an alternate embodiment, state of the art teleprompters can utilize video cameras providing a live feed of the individual soliciting a response from the photography subject. Such an embodiment of the prior art teleprompter requires that the individual soliciting a response be located separate and apart from the teleprompter and the photography subject. Otherwise, the photography subject may be forced to distinguish between two separate areas of possible focus, the teleprompter image versus the individual soliciting the response. In addition, the logistics of shooting the solicitor compromises lighting, sound, etc., and thus interferes with the primary object of the shoot. Yet, removing a trainer or parent from the proximity of an animal or child being photographed increases the stress upon all participants.

Therefore, there is a need in the art for a means for reliably and consistently reflecting a three dimensional image with left, right, top, and bottom correct directly in front of a camera lens so that difficult photography subjects, such as small children and animals, will be attracted by the reality of the reflection and thereby deceived into focusing their attention upon a desired focal point, directly into a camera lens, for example.

SUMMARY OF THE INVENTION

The objects, features, and technical advantages of this invention are achieved by a system and method which is capable of reflecting an image that has apparent depth, is reflected in real time, and is left-right, top-bottom correct.

Solicitation of the reaction desired is achieved by placing a front surface mirror in front of the desired focal point and reflecting a second mirror that may be focused on a trainer, mother, or commercial director, for example. Thus, a live image is reflected and remains realistic, or as an object that is particularly attractive to the photography subject.

A technical advantage of the invention is that it provides the individual soliciting the response with the ability to have live interaction with the photography subject. The real-time aspect of this invention is particularly useful when a commercial director or animal trainer does not know what object of focus will elicit the appropriate response from the animal or child. Furthermore, as different children or animals appear before the camera, their respective parents or trainers can be interchanged with ease.

It is another technical advantage of this invention that the individual soliciting a response from the photography subject remains in close proximity to the subject. This close proximity provides a sense of intimacy that teleprompters of the prior art cannot provide. For small children and animals the proximity of a parent or trainer prompting the response provides comfort and virtually eliminates stress.

Another technical advantage of this invention arising out of the close proximity of the prompter is that the talent or subject of photography feels the close proximity of the prompter and believes that the images reflected by this invention are not manipulated, but are real objects.

Yet another technical advantage of this invention arising out of the close proximity of the prompter is that when the talent being photographed is comforted and relaxed, the talent creates a better image for the producer or photographer.

Another technical advantage of this invention is that it reduces the stress upon the talent photographed. Because the talent perceives the interaction between itself and the image reflected by the invention as normal, the talent is not required, asked, nor forced to look in a direction that is uncomfortable or unnatural. This invention, then, takes advantage of the natural instinct of an animal or a child to gaze directly upon food or the eyes of a mother.

Yet another technical advantage of this invention is, because the talent is gazing upon what is perceived to be a natural focal point, a better image is produced for the producer.

Another technical advantage of this invention is that because the individual solicits a response from the talent in real time, producers will not have to expend time or money to prepare material in pre-production to use for prompting. Instead, producers can adjust the style of prompting until the subject's eyes are focused appropriately rather than anticipating what reflected image might work for each subject.

Yet another technical advantage of this invention is that it permits producers to be certain that the attention of a subject is properly focused during live performances and will allow the prompter to change approaches during performance to maintain better images.

Another technical advantage of this invention is that it presents an image that is left-right correct thereby allowing for use of sign language, text, facial expressions, or photographs when prompting a photography subject, for example.

An additional advantage of this invention is that it is non-electronic. However, some versions may be built with a light to illuminate the prompter's face.

Another advantage of this device is that in an alternate embodiment it may be simply manipulated to reflect images into the camera lens. Simply changing the angle of the reflective surface results in a device which will reflect a secondary image onto the film or tape without an actor's knowledge. For example, when filming, a star shaped source may be reflected into a reflective pane without distracting actors who will continue to address the camera as normal.

Yet another technical advantage of this invention is that, in an alternate embodiment it may be simply manipulated to reflect images into the camera lens to produce special effects which do not occur in nature. For example, a portion of the screen may be illuminated by the appearance of a sun ray originating in clouds. This device will permit reflection of such a secondary image so that it is a live, through the camera experience. Thus, those producing the image may immediately determine if the image produced has the desired effect.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
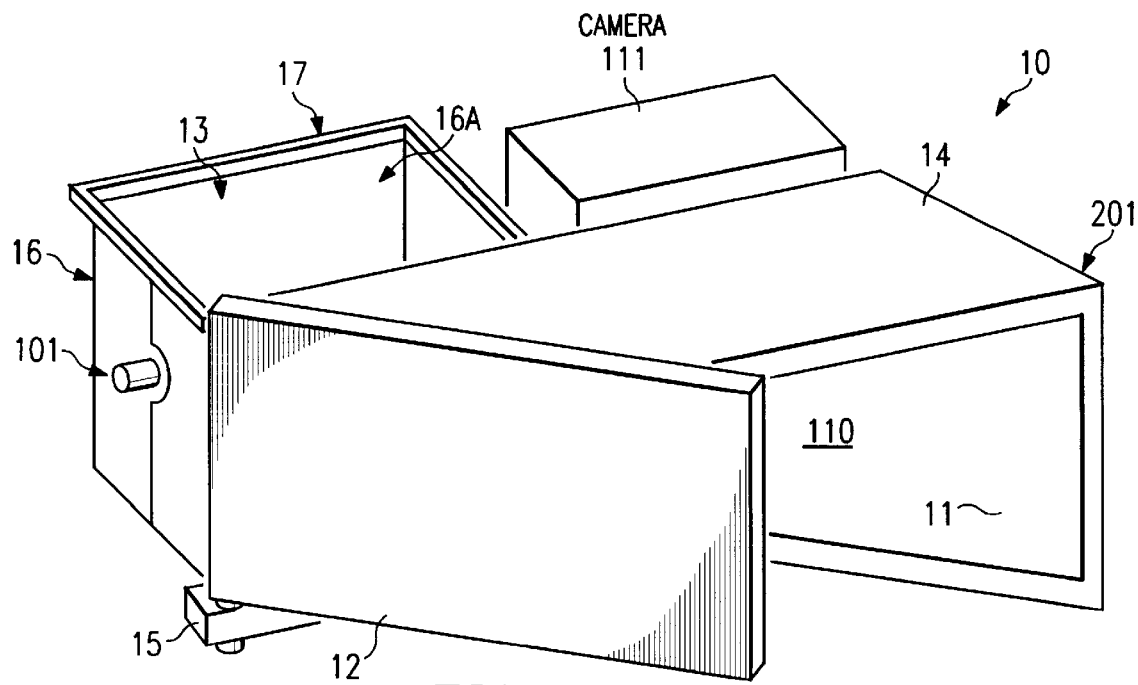
FIG. 1 is an illustration of the front view of a first embodiment of the invention.

FIG. 1 illustrates the front view of a first embodiment of an attention focusing device 10. Reflective mirror 11 acts as a beam splitter. Beam splitter 11 serves two functions. Beam splitter 11 splits the image of the prompter so that the subject of photography can view the prompter. In addition, beam splitter 11 serves to permit a camera lens to capture an image of the subject of photography while blocking the image of the prompter. In a preferred embodiment the beam splitter 11 is comprised of fifty-fifty transparent glass which reflects half of the light hitting its surface and transmits the other half of the light reaching its surface. Although fifty-fifty transparent glass is used in the preferred embodiment, glass having other ratios of light reflection-transmission may also be used. For example, in certain applications, a window pane, piece of glass, or any reflective surface such as mylar, plastic, or diffusion material may be utilized as beam splitter 11.

Figure 3:
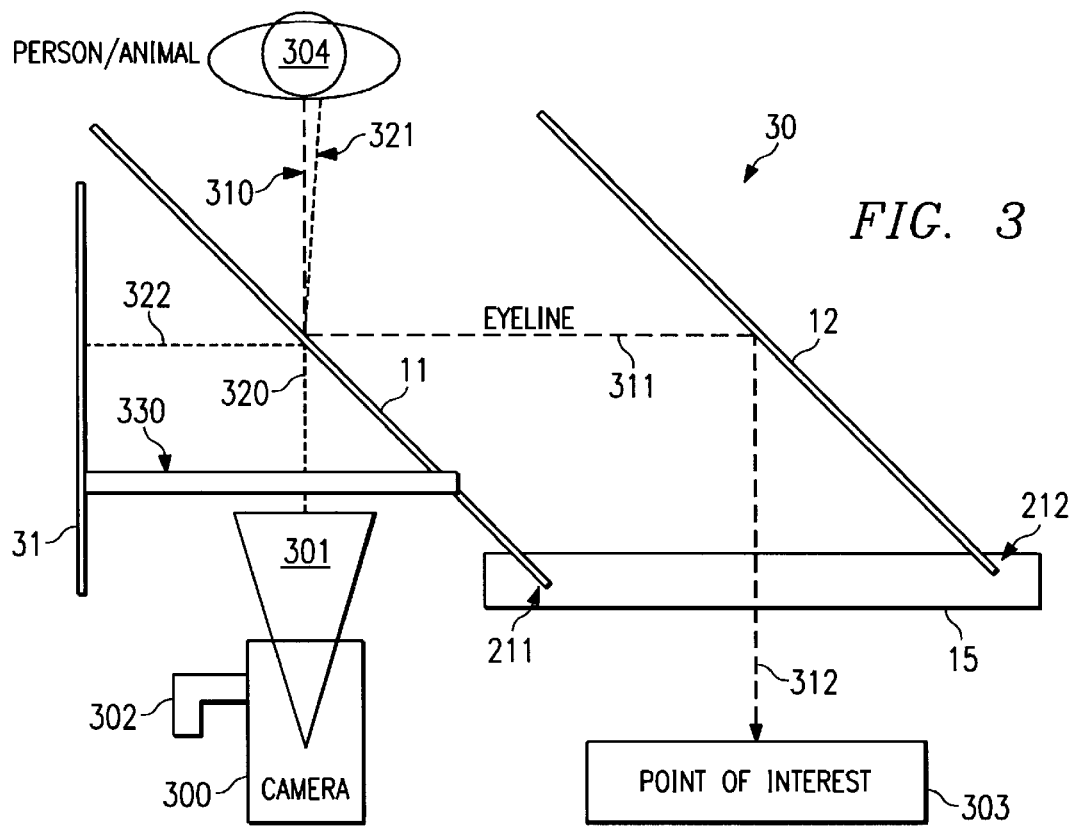
FIG. 3 is a top view of the first embodiment of the invention.

In use, an actor (not shown) is placed in front of device 10 and looks toward a reflection which is visible in image area 110 located at the desired focal point of lens 301 (FIG. 3). The image viewed in image area 110 is a reflection of reflective pane 12 which in turn reflects the point of interest 13 residing in reflection box 17. Note that reflection box 17 is an accessory that is useful when filming animals and may not be required when filming people.

In fact, the function served by reflection box 17, secluding a point of interest, could just as well be served by a drape or any other material which can be manipulated to surround the point of interest.

As the subjects of photography, motion picture, live video, or still image gaze into image area 110, in a particular embodiment, they will be, in fact, focusing directly into the lens of a camera 111 located behind beam splitter 11. This operation will be described in detail in conjunction with FIGS. 3, 4, and 5, discussed below. Beam splitter 11 and reflective pane 12 are supported by bar 15. Both beam splitter 11 and reflective pane 12 may be folded, via hinges 211, 212 (FIG. 2), and made collapsible for easy shipping.

When open and properly assembled, in a preferred embodiment, beam splitter 11 and reflective pane 12 are parallel to each other at a 45 degree angle from bar 15. Bar 15 acts to support both reflective pane 12 and beam splitter 11. Reflective pane 12 and beam splitter 11 are attached to bar 15 by a simple fastener arrangement 211, 212 which advantageously act as hinges for folding purposes. The simple fastener arrangement permits loosening of reflective pane 12 and beam splitter 11 so the angles they form with bar 15 may be adjusted, or reversed as in an alternate embodiment of the invention which is discussed below.

Figure 2:
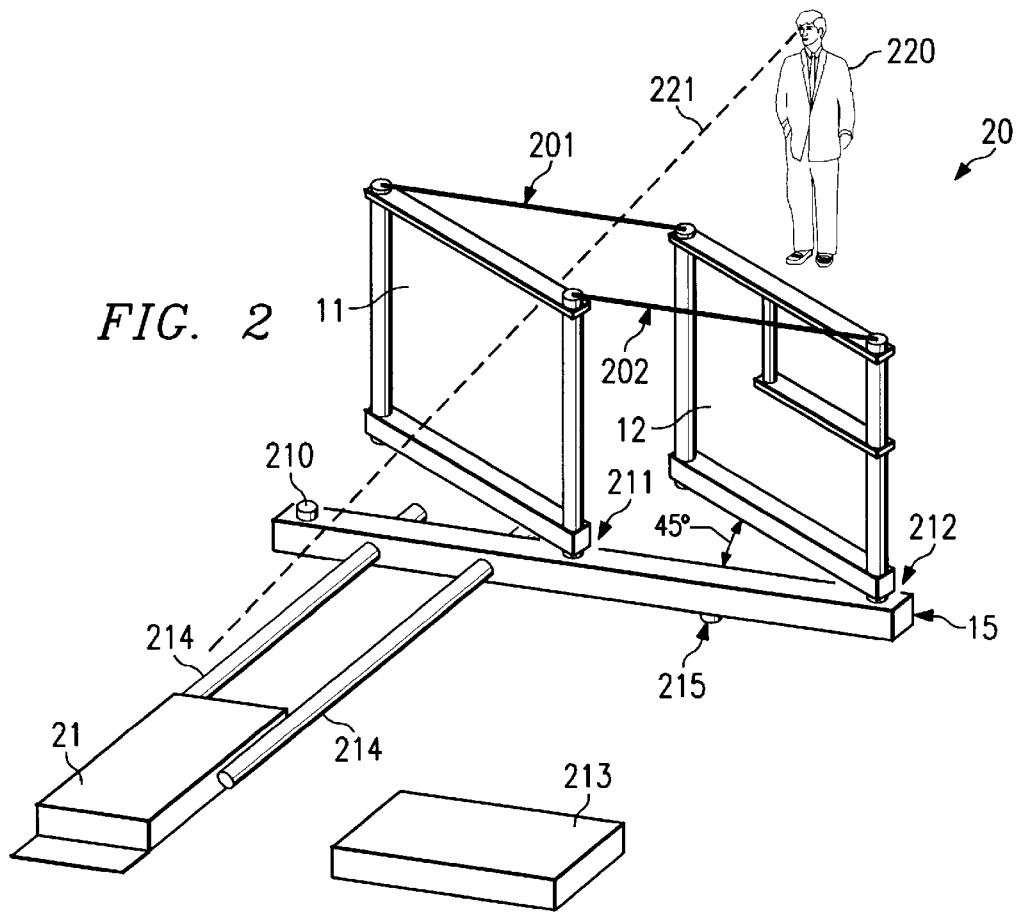
FIG. 2 is an illustration of the rear view of a first embodiment without a canopy.

Rods 201 and 202, shown in FIG. 2, maintain beam splitter 11 and reflective pane 12 in parallel. However, under certain lighting conditions, to achieve the desired quality of reflection in image area 110 and make it comfortable, beam splitter 11 and reflective pane 12 may require adjustment such that they are disposed at an angle other than 45 degrees from bar 15 and/or are not precisely parallel to each other. Thus, the position of rods 201 and 202 can be adjustable via fasteners operating in conjunction with slots in bars 201, 202.

Reflection box 17 (FIG. 1) provides a stage or arena for point of interest 13. As an example, when photographing a dog, the dog's trainer may place a piece of food or a squeak toy in the stage area of reflection box 17. In a preferred embodiment, reflection box 17 is white on the inside and black on the outside. The white provides an even clean background resulting in an unobstructed view of the image reflected which enhances the animal's ability to focus on the item the trainer is commanding the animal to observe. Although the inside of reflection box 17 is white in a preferred embodiment, other colors may be used to solicit different responses from different types of photography subjects. For example, reflection box 17 with red walls on the inside reflecting an object against the red background may be more attractive for an infant or a bird that is being photographed.

Reflection box 17 may have hinges 16 and 16A so that when tab 101 is pulled, reflection box 17 will open. In the open position, reflection box 17 permits placement of larger objects as point of interest 13 for reflection into image area 110. For example, when reflection box 17 is opened, the trainer of the animal being photographed may place his/her face in the point of interest 13 for reflection into image area 110. The animal (or child) being photographed could then be easily coaxed into looking upon the handler's face in image area 110 and thus be tricked into focusing directly upon the camera lens.

To provide an even larger point of interest 13 or for the comfort of the solicitor, reflection box 17 may be removed. With reflection box 17 removed, device 10 may be used with children (all ages), older adults, and the disabled, for example. Removal of reflection box 17 would permit a prompter to look directly into mirror 12 which reflects to beam splitter 11 and straight to the actor. The larger point of interest 13 will permit the prompter to make larger movements, signing to a deaf child for example, when prompting the photography subject. Or, a director, situated at the larger point of interest, may prompt an actor to mimic expressions.

A shroud area is designed as a courtesy lens shade 14 to prevent stray light from hitting the lens, mirrored or glass surfaces and contaminating the exposure. Behind beam splitter 11 there is dark surface 31 (FIG. 3) which, in a preferred embodiment, is black. The purpose of dark surface 31 is to cancel any reflection the camera lens may receive from beam splitter 11. In different embodiments, the dark surface may be a color which would reflect into the shadow area of the film to tint the exposure with color.

FIG. 2 is the rear view of one embodiment of device 20. Device 20 lacks courtesy lens shade 14, reflective box 17 and dark surface 31. Bar 15 contains three positions, such as holes 210, 211, and 212, for accepting the vertical support structures of reflective pane 12 and beam splitter 11. However, bar 15 may contain several different holes, latches, hook and eye material, or any other means for attaching beam splitter 11 and reflective pane 12, to provide for several different configurations of device 20 at the operator's option. The number of holes or latches contained in bar 15 is only limited by the requirement that it also support reflective pane 12 and beam splitter 11. Camera support device 21 may be attached to bar 15, via rods 214. Camera support device 21 may be an industry standard style sliding base plate, for example, and can be adapted for still, video or film cameras.

In one preferred embodiment (FIG. 2), the camera would be fastened to the center of camera support device 21 with the lens facing the back side of beam splitter 11. Photography subject 220 looking into beam splitter 11 via eye line 221 then may be filmed through translucent beam splitter 11 and appear to be looking directly into the camera lens.

Food, a translator, or a toddler's mother, among other things, may be placed at point of interest 213. Point of interest 213 is reflected into reflective pane 12. Reflective pane 12 in turn reflects the image of point of interest 213 to the front side of beam splitter 11. Finally, beam splitter 11 reflects point of interest 213 image into image area 110 and thus to the photography subject 220 along eye line 221. In embodiments illustrated in FIGS. 1–4, beam splitter 11 produces an image with correct left-right orientation while also providing a strong sense of three dimensions.

In FIG. 2, rods 214 of the sliding base plate 21 are inserted or attached to bar 15 and serve as a support. In a preferred embodiment, bar 15 has a threaded hole 215 for accepting a tripod or camera attachment plate.

FIG. 3 shows a view of camera 300 with a field of view 320 that faces a person or subject 304. Camera 300 faces beam splitter 11 and photographs a subject 304 without degradation. Although beam splitters reduce the amount of light hitting the film, the image quality is uninterrupted.

Eye line 310 of photography subject 304 is interrupted by beam splitter 11 which reflects the image in reflective pane 12. Reflective pane 12, in turn, reflects point of interest 303. Thus, directly in front of camera lens 301, an image having left, right, top and bottom is presented to subject 304 giving subject 304 the sensation that he/she is looking at a real object rather than a mere reflection. The proximity of point of interest 303 and subject 304 can be very close or somewhat distant. The distance between subject 304 and point of interest 303 may be as short as two to six feet.

The ability to have point of interest 303 so close to subject 304 is an advantage provided by the invention. For example, when using the invention to coax an infant to look into the image produced by the invention, the close proximity of its mother's voice provides comfort and a realistic quality to the image produced by the invention.

In a preferred embodiment, dark field 31 is used to provide a dark and non-exposed field for camera 300. As camera lens 301 is pointed at subject 304, the field of view 320, 321 of camera 300 is interrupted by the beam splitter 11 which reflects dark field 31. Although field of view 321 extends beyond beam splitter 11 to subject 304, the camera's field of view 320 is unavoidably interrupted by the beam splitter. Unwanted material is not apparent, via field of view 322, to camera lens 301. In the preferred embodiment, dark field 31 is black.

Figure 3A:
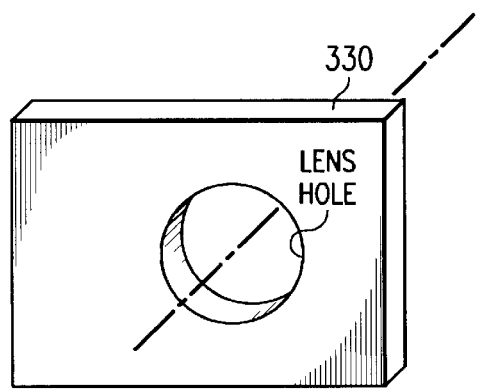
FIG. 3a is an illustration of a shroud.

When subject 304 looks toward beam splitter 11 and into camera lens 301, dark shroud 330 (shown in detail in FIG. 3*a*) is required to darken the image seen through beam splitter 11 so the only image perceived by subject 304 is the image reflected from point of interest 303. Shroud 330 is generally made of rubber (like a mouse pad) and has a hole cut in it to accommodate the front element of lens 301. For this reason, in the film industry, shroud 330 is called a "rubber donut." This "rubber donut" fits snugly around the front element 301 and provides a black field directly behind beam splitter 11. When actor 304 looks towards lens 301, this black field helps actor 304 ignore any item behind beam splitter 11 and get a better reflection of point of interest 303. In smaller and lighter versions of the invention, this "rubber donut" may serve as the means for attaching the invention to a photography device.

Figure 4:
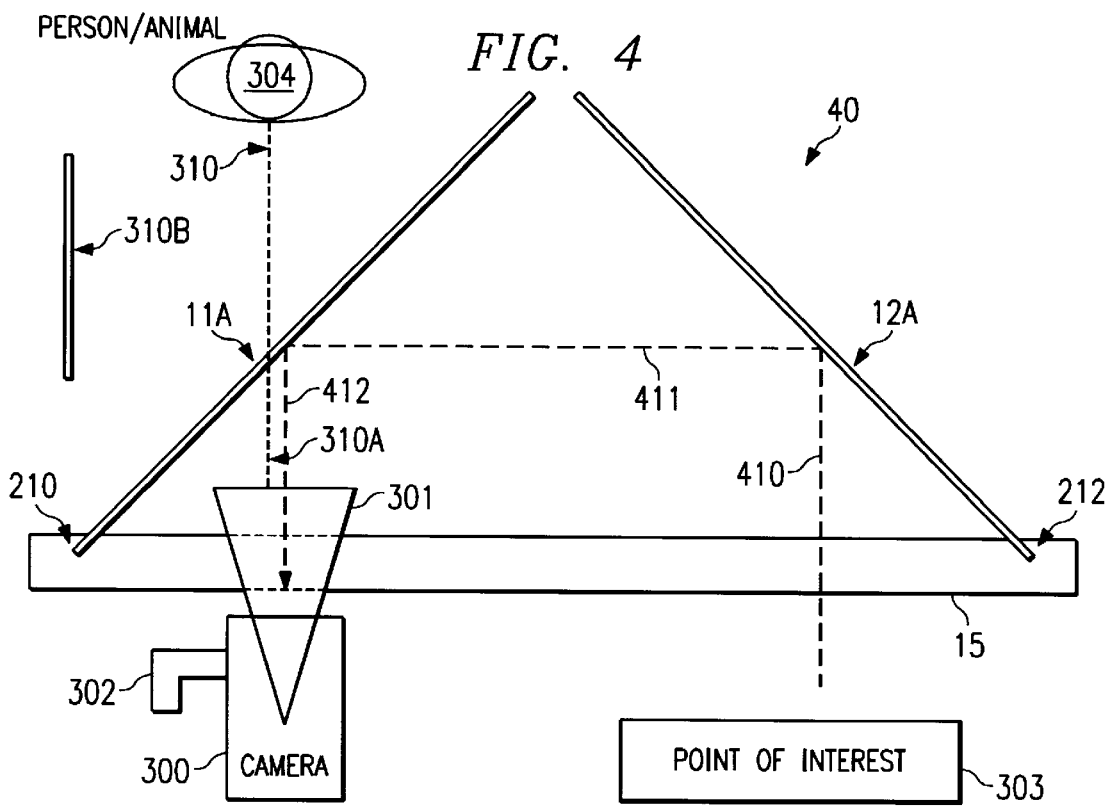
FIG. 4 is top view of an alternate embodiment of the invention.

Another embodiment 40 of the invention is shown in FIG. 4. This embodiment permits the reflection of point of interest 303 into camera lens 301 as opposed to photography subject

304. In this embodiment, bar 15 provides structural support for beam splitter 11A. Beam splitter 11A may be comprised of the same types of material as described above in the description of the first embodiment. Beam splitter 11A is fastened to bar 15 at connection point 210. The precise angle formed between beam splitter 11A and bar 15 may vary as required to produce the desired effect.

In this alternate embodiment, subject 304 looks toward camera 300. The subject's eye line 310, 310A is unavoidably interrupted by a reflection from beam splitter 11A. Dark field 310B may be reflected by beam splitter 11A to prevent reflections which might distract photography subject 304. The subject's image continues through beam splitter 11A such that subject 304 is recorded on film.

As camera lens 301 is pointed towards subject 304, camera 300 will not only film subject 304, but also point of interest 303 reflected from reflective pane 12A by beam splitter 11A along field of view 410, 411, 412. Reflective pane 12A is positioned on bar 15 at connection point 212 such that its field of view 410 includes point interest 303. Field of view 411 of the beam splitter 11A then picks up the reflection of point of interest 303 from reflective pane 12A.

For example, alternate embodiment 40 can be utilized to produce a composite image of actor 304 and a star shaped light reflected over the actor's shoulder. This may be accomplished by placing a small star shaped light source facing reflective pane 12A at point of interest 303. The light source would then fall within field of view 410 of reflective pane 12A. Beam splitter 11A would then pick up the image of the light source along its field of view 411 and reflect it into camera lens 301 along the camera lens' field of view 412. Meanwhile, the camera's field of view 310, 310A would composite actor's image 304 and the star shaped point of interest 303 in a single exposure. Actor 304 remains undistracted because the actor's immediate field of view 310 will not encompass the star shaped light reflected. An advantage of embodiment 40 is that a producer may composite special effects in camera while filming stills or video (live and tape) and determine whether the effect achieved is the effect desired at time of photography rather than awaiting post production compositing of elements.

Figure 5:
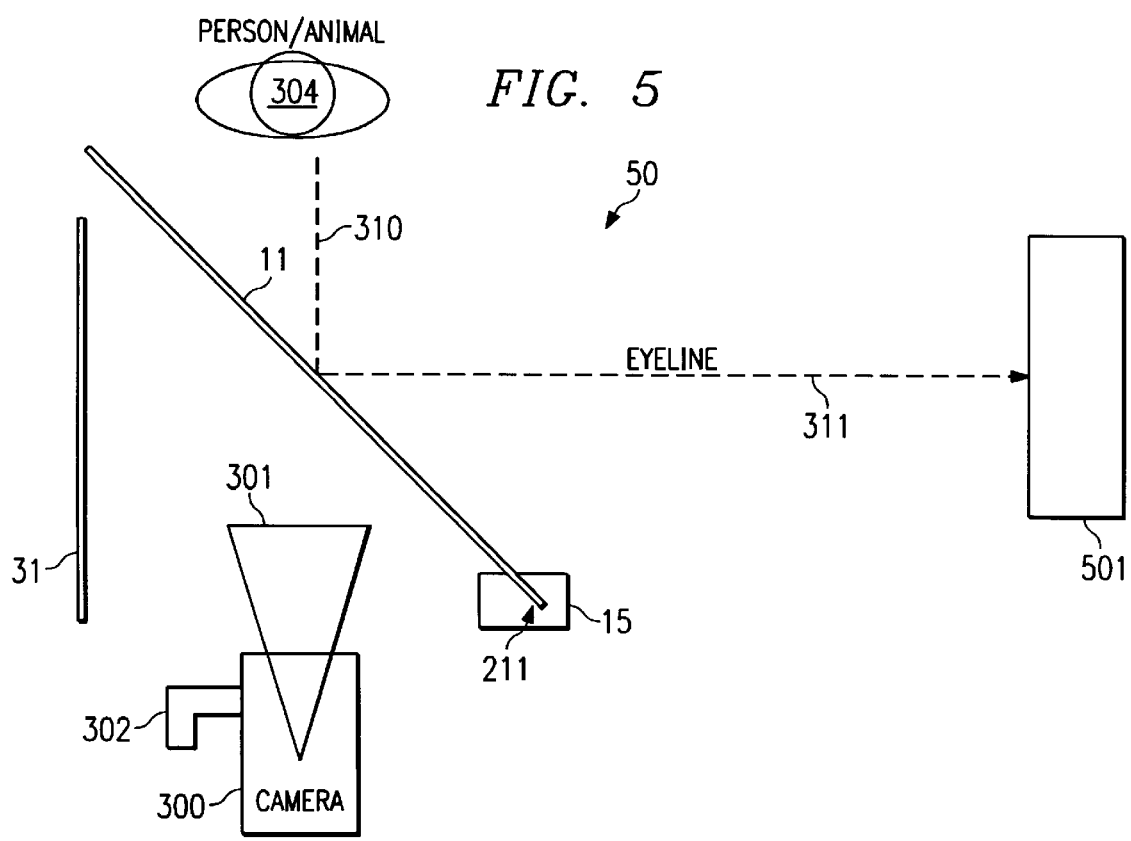
FIG. 5 is an illustration of an alternate embodiment where the image is created at an angle from the target.

FIG. 5 illustrates yet another variation of the original concept of this invention. This embodiment permits an individual to view point of interest 501 while looking straight into camera lens 301. As the subject of photography 304 looks toward camera 300, its visual attention is interrupted by beam splitter 11 and reflected along 311 to point of interest 501. In this embodiment, beam splitter 11 is fastened to bar 15 at connection 211 which may be fixed or adjustable. Dark field 31 may be utilized to cancel unwanted reflections from the back side of beam splitter 11.

In another variation of the aforementioned embodiments, a projected image may be used to provide a different effect as perceived by the photography subject or camera lens. Projection may also be used in conjunction with a live image at the point of interest to produce a superimposed image for viewing in the presentation area.

Although the present invention and its advantages have been described in detail, it should be understood that various changes, substitutions and alterations can be made herein without departing from the spirit and scope of the invention as defined by the appended claims.

What is claimed is:

1. A device for directing the eyes of a subject toward a camera using a point of interest, said device comprising:

a beam splitter interposed between said subject and said camera at an angle to an imaginary line from said subject to the camera lens, said imaginary line parallel to the lens' optical axis;

a reflective surface positioned outside a field of view of said camera, wherein an image of said subject is partially transmitted to said camera and partially reflected to said reflective surface by said beam splitter, wherein said reflective surface is disposed at an angle to a line perpendicular to the direction of said image reflection of said subject from said beam splitter, wherein said point of interest is disposed in a path of an image reflection from said reflective surface, wherein said image reflection from said reflective surface is a mirror image of said image reflection of said subject from said beam splitter, and wherein said reflective surface and a reflective surface of said beam splitter are parallel to each other, whereby a left-right, top-bottom correct image of said point of interest is visible to said subject.

2. The device of claim 1, wherein the point of interest and the subject are in close proximity to each other.

3. The device of claim 1, wherein said first-mentioned reflective surface and said beam splitter are each pivotally connected to a support member.

4. The device of claim 3, wherein a distance between said first-mentioned reflective surface and said beam splitter is adjustable.

5. The device of claim 3, wherein an angle between said support member and said first-mentioned reflective surface and an angle between said support member and said beam splitter are adjustable.

6. The device of claim 5, wherein said beam splitter and said first-mentioned reflective surface are slightly adjustable so as to be not precisely parallel to each other, whereby a desired quality of reflection may be achieved based on lighting conditions.

7. The device of claim 3, further comprising means removably connected to said support member for secluding the point of interest.

8. The device of claim 3, further comprising a reflection box removably connected to said support member behind said first-mentioned reflective surface.

9. The device of claim 8, wherein said reflection box has a hinged door providing access to said point of interest.

10. The device of claim 1, further comprising a dark surface disposed at an angle to said beam splitter and on a side of said beam splitter opposite said first-mentioned reflective surface.

11. The device of claim 1, further comprising a dark shroud around said camera lens.

\* \* \* \* \*